US006623773B2

(12) United States Patent
Meier et al.

(10) Patent No.: US 6,623,773 B2
(45) Date of Patent: *Sep. 23, 2003

(54) PACKAGING MATERIAL FOR CURING OR MARINATING FRESH FOODS DURING STORAGE AT LOW TEMPERATURES

(75) Inventors: Hans J. Meier, Riverview (CA); Germain Landry, Fredericton (CA); Raymond Caissie, Dieppe (CA)

(73) Assignee: Transform Pack Inc., Dieppe (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/065,534

(22) Filed: Apr. 24, 1998

(65) Prior Publication Data

US 2001/0055640 A1 Dec. 27, 2001

Related U.S. Application Data

(63) Continuation-in-part of application No. 08/554,772, filed on Nov. 7, 1995, now abandoned.

(30) Foreign Application Priority Data

Nov. 9, 1994 (CA) .............................................. 2135416

(51) Int. Cl.⁷ .............................. A23B 4/18; A23L 1/22; B65D 81/28; B65D 65/42
(52) U.S. Cl. ....................... 426/132; 426/129; 426/130; 426/133; 426/112; 426/324; 426/415
(58) Field of Search ................................. 426/133, 415, 426/324, 326, 112, 129, 130, 132

(56) References Cited

U.S. PATENT DOCUMENTS 2,417,889 A * 3/1947 Stammelman .............. 426/133
2,528,204 A    10/1950 Zwosta
2,923,632 A *  2/1960 Castberg ................... 426/133

(List continued on next page.)

FOREIGN PATENT DOCUMENTS

| CA | 857827 | 12/1970 |
|---|---|---|
| CA | 878423 | 4/1971 |
| CA | 2049271 | 8/1971 |

(List continued on next page.)

OTHER PUBLICATIONS

Byproducts From Milk; 1970, Webb et al, AVI Publishing pp. 296–299.

Food Chemistry, 1985, O.R. Fennema, 2nd Edition, 104–107; 6–11; and 348–353 Edition.

Product Brochure, Daviso Internation Inc. (date unknown).

Primary Examiner—Steven Weinstein
(74) Attorney, Agent, or Firm—Cassan Maclean

(57) ABSTRACT

A packaging material for packaging a selected fluid-containing fresh food item for providing simultaneous curing or marinating of such food item and storage of the same at normal refrigeration temperatures. A packaging material comprises a substrate suitable for contact with food and a food treatment layer comprises a predetermined amount of edible adhesive applied to a food contacting surface of the substrate and a curing or marinating agent mixed in, retained and calibrated by the adhesive. The adhesive is capable of dissolving in fluid from the food at a temperature in the range of −3° C. to −4° C. The amount of curing or marinating agent retained by the predetermined amount of adhesive is that which is required to substantially cure or marinate the selected food item. The amount of the adhesive is determined by the amount of curing or marinating agent required to be retained by it.

4 Claims, 1 Drawing Sheet

U.S. PATENT DOCUMENTS

| | | | |
|---|---|---|---|
| 2,979,410 A | | 4/1961 | Parlour |
| 3,003,883 A | | 10/1961 | Ley |
| 3,042,532 A | | 7/1962 | Daline |
| 3,047,403 A | * | 7/1962 | McConnell .................. 426/133 |
| 3,134,678 A | | 5/1964 | Wierbicki et al. |
| 3,215,540 A | | 11/1965 | Wierbicki et al. |
| 3,526,521 A | | 9/1970 | Komarik |
| 3,537,864 A | | 11/1970 | Magigra |
| 3,645,757 A | | 2/1972 | Gordon et al. |
| 3,740,236 A | | 6/1973 | Baxley |
| 4,053,650 A | | 10/1977 | Chino et al. |
| 4,161,545 A | | 7/1979 | Green et al. |
| 4,196,220 A | | 4/1980 | Chiu et al. |
| 4,308,289 A | | 12/1981 | Huisman et al. |
| 4,501,758 A | | 2/1985 | Morris |
| 4,756,914 A | | 7/1988 | Jon et al. |
| 4,818,548 A | | 4/1989 | Cheng |
| 4,981,707 A | | 1/1991 | Morris |
| 5,573,797 A | * | 11/1996 | Wilhoit ....................... 426/133 |
| 5,573,800 A | * | 11/1996 | Wilhoit ....................... 426/133 |

FOREIGN PATENT DOCUMENTS

| | | | |
|---|---|---|---|
| CA | 905744 | | 7/1972 |
| CA | 1053497 | | 5/1979 |
| CA | 2007522 | | 1/1990 |
| CA | 2100074 | | 8/1992 |
| CA | 2086481 | | 12/1992 |
| CA | 1329890 | | 5/1994 |
| DE | 0/172/432 A2 | | 7/1985 |
| EP | 0473 091 | | 3/1992 |
| FR | 2634976 | | 8/1988 |
| JP | 57 170 175 | | 10/1982 |
| JP | 57 170 176 | | 10/1982 |
| JP | 58 101 670 | | 6/1983 |
| WO | WO96/14760 | * | 5/1996 |

* cited by examiner

PACKAGING MATERIAL FOR CURING OR MARINATING FRESH FOODS DURING STORAGE AT LOW TEMPERATURES

RELATED APPLICATION

This is a continuation-in-part application of application Ser. No. 08/554,772 filed Nov. 7, 1995 now abandoned.

FIELD OF THE INVENTION

The invention concerns the processing of fresh foods by packaging in such a way as to achieve marinating or curing of the foods at low temperatures during the time that the foods are stored prior to consumption. More particularly, it is directed to a method and packaging material for wrapping fresh food products and marinating or curing the same during cold storage.

BACKGROUND OF THE INVENTION

Methods are known for curing or marinating fresh food products using various chemical formulations. Examples include the curing of meat using sodium chloride and curing salts comprising nitrates and nitrites: Canadian Patent 905,744 (Komarik) and U.S. Pat. No. 3,526,521 (Komarik); improving shelf life characteristics using a composition comprising a phosphate, ascorbic acid and citric acid: U.S. Pat. No. 4,818,548 (Cheng). Methods are known for protecting food against microorganisms using preserving liquids: Canadian Patent 1,329,890 (Saitoh) and Canadian Patent Application 2,100,074 (Sekiyama); and, for marinating meat by means of a marinating liquid: U.S. Pat. No. 3,537,864 (Magiera). It is also known to provide a sheet for wrapping food from which a discrete dried food material layer is transferred to the surface of the food during the processing (e.g. cooking) of the wrapped food product: Canadian Patent Application No. 2,007,522 (Ito et al). Further, specially fabricated polymer sheets having food modifiers and flavorings blended therein are known for transferring limited amounts of modifiers and flavorings to the surface of food products wrapped in such sheets: Canadian Patent Application No. 2,049,271 (Juhl).

However, none of these known methods contemplates a method or means which would enable food dealers to package fresh meat, poultry, fish, vegetables or fruit and store the same (including shipment and like handling by vendors and consumers prior to consumption of the food) at normal refrigeration temperatures while simultaneously, during such storage, causing such food to become marinated or cured.

SUMMARY OF THE INVENTION

In accordance with the invention there is provided a method of packaging a selected fluid-containing fresh food item for providing simultaneous curing or marinating of such food item and storage of the same at normal refrigeration temperatures. A fresh food item is wrapped in a packaging material comprising a substrate suitable for contact with food and a food treatment layer comprising a predetermined amount of edible adhesive applied to a food contacting surface of the substrate and a curing or marinating agent mixed in, retained and calibrated by the adhesive. The adhesive is capable of dissolving in fluid from the food at a temperature in the range of −3° C. to +4° C. The amount of curing or marinating agent retained by the predetermined amount of adhesive is that which is required to substantially cure or marinate the selected food item. The amount of the adhesive is determined by the amount of curing or marinating agent required to be retained by it. When the food item is wrapped in the packaging material the food treatment layer is in intimate contact with the food item. The substrate may be a film which is substantially impermeable to air and microorganisms and/or the wrapped food item may be sealed in a container that is substantially impermeable to air and microorganisms. The wrapped/sealed food item is maintained at said low temperature at least until it is substantially cured or marinated.

Also in accordance with the invention there is provided a packaging material for wrapping a selected fluid-containing fresh food item to provide simultaneous curing or marinating of the food item and storage of the food item at normal refrigeration temperatures. The packaging material comprises a substrate suitable for contact with food and a food treatment layer. The substrate may be a film and is preferably impermeable to air and microorganisms. The food treatment layer comprises a predetermined amount of edible adhesive applied to a food contacting surface of the substrate and a curing or marinating agent mixed in, retained and calibrated by the adhesive. The adhesive is capable of dissolving in fluid from the food item at a temperature in the range of −3° C. to +4° C. The amount of curing or marinating agent retained by the predetermined amount of adhesive is that which is required to substantially cure or marinate said selected food item and the amount of adhesive has been determined by the amount of curing or marinating agent required to be retained by the adhesive. Optionally, both sides of a film substrate may have a food treatment layer applied to them.

BRIEF DESCRIPTION OF THE DRAWINGS

The invention is described below with reference to the following drawing of one embodiment thereof.

DETAILED DESCRIPTION OF A PREFERRED EMBODIMENT

Figure 1:
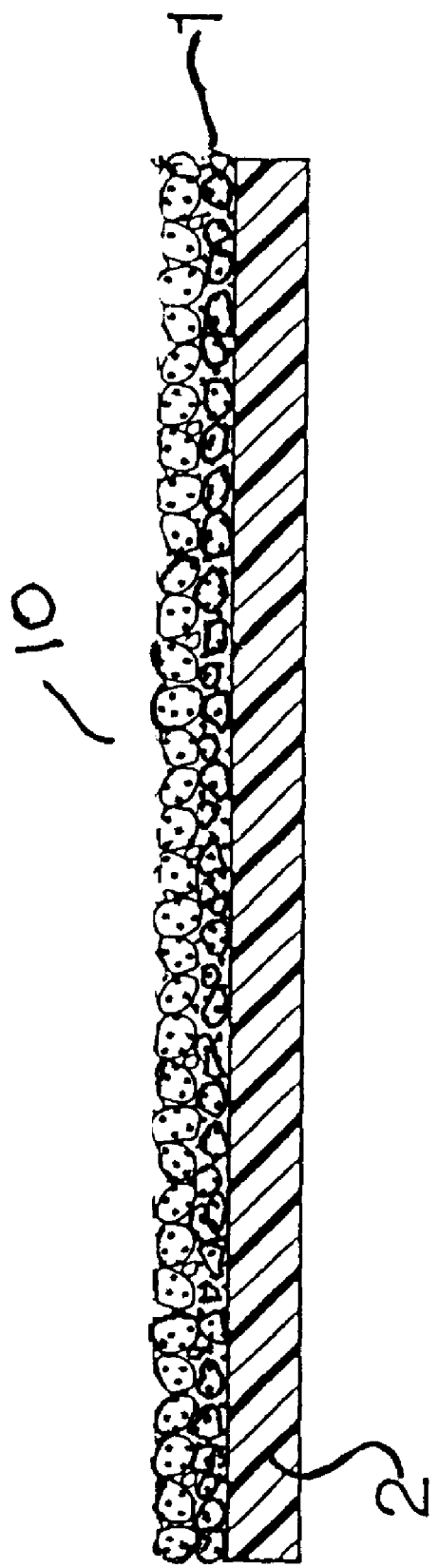
FIG. 1 is a cross-section of a food wrapping sheet comprised in accordance with the invention.

The method of packaging fresh food according to the invention uses a packaging material as illustrated in FIG. 1. The packaging material 10 comprises a substrate 2 and a curing/marinating food treatment layer 1 comprising a calibrated amount of an edible adhesive and a curing or marinating agent mixed therein and retained by the adhesive. The adhesive is sufficiently tacky and viscous both to adhere to the substrate and be subject to application over the substrate in an even thickness and amount which is calibrated to hold a sufficient quantity of curing or marinating agent to cure or marinate a particular size or weight of the food item for which the packaging material is to be used. The word "calibrate" used herein with reference to the adhesive means that the amount of the adhesive applied to the substrate is adjusted exactly so that it will hold the particular quantity of curing or marinating agent which is required to be able to cure or marinate the particular food item for which the packaging material is intended. The amount of agent required for any given application is dependent upon the concentration and makeup of the selected agent as well as the particular food item to which it is to be applied.

The substrate can be any packaging material that is suitable for contact with food including film, foil or laminate. Suitable films are described in *Plastic Films for Packaging*, C. J. Benning, Technomic Publishing Inc., (1983), Ch. 6, and in Canadian Patent Application 2,086,481

(Kilton). The film can be made of such materials as polyvinyl chloride, polyethylene, polypropylene, polystyrene, polyamides and polyesters. In the preferred embodiment, as illustrated, the film is of a thickness commonly used for food packaging films, typically between 0.001" and 0.020".

The adhesive of the food treatment layer 1 is an edible substance whose function is to adhere the curing or marinating agent to the film at predetermined loadings of the agent (the specific loading to be provided on the basis of the size, weight and type of food item to be wrapped and the characteristics of the particular agent used) and to melt and release the agent at ordinary refrigeration temperatures when layer 1 comes into contact with a fluid-containing fresh food product. The adhesive chosen for a particular fresh food item should be one which dissolves in the juices or fluids of the food even at temperatures around 0° C. The preferred adhesive is a mixture of a natural polysaccharide, such as maltodextrin, with whey protein concentrate, water and a viscosity modifier. Suitable adhesives are described in U.S. Pat. No. 4,501,758 (Morris). The preferred adhesive is prepared by blending together 40–50% by weight maltodextrin, 5–15% by weight whey protein concentrate, up to 1% xanthan gum and 40–50% water. The adhesive should have a consistency that makes it suitable for being evenly applied to the film with a predetermined thickness such that the applied adhesive is calibrated. The xanthan gum is a viscosity modifier added to optimize the consistency of the adhesive.

The curing or marinating agent is a substance capable of curing or marinating the particular fresh food at low temperatures, i.e. at refrigeration temperatures around 0° C. The term "curing or marinating agent" herein means any edible composition effective for curing or marinating fresh foods at temperatures around 0° C. It can be a mixture of substances and may be in the form of chips, powders, irregular pieces and other forms. Powdered materials having a high surface area are preferred in order to have a maximum effect on the fresh food product.

In addition to achieving a taste result the curing or marinating agent permits the food product to remain commercially acceptable after aging in a sealed package; absent such agent, the food product would not be in commercially acceptable condition after aging.

In the case of red meat, the agents used are referred to as marinating agents; in the case of fish and other seafood, as marinating and curing agents. Preferred curing or marinating agents include mixtures of various of the following natural substances: vinegar, sugar, beef base, salt, glucose solids, hydrolyzed plant protein, hydrogenated peanut oil, yeast extract, sugar, citric acid, cream of tartar, herbs, spices, dried fruit such as cranberries and natural flavorings. These may be combined to create popular recipe tastes such as Teriyaki and Souvlaki.

For example, to marinate and tenderize aging red meat an agent that can be used is a powdered or liquid mixture of sugar, beef base, salt, glucose solids, hydrolysed plant protein, hydrogenated peanut oil, yeast extract, spices, flavorings and dried cranberries. For curing fresh salmon, an agent that can be used is a powdered mixture of salt, sugar, citric acid, cream of tartar, herbs, spices and flavorings. Marinating agents usually include an acidic component and any consumable acid, such as citric acid, may be appropriate.

Depending on the application, meat stocks, edible acids and preservatives, natural and artificial flavoring agents and various herbs and spices can be included in the curing or marinating formula. Liquid constituents of the agent, such as Liquid Smoke, are added to the adhesive before the adhesive is applied to the film. By doing so the indirect application of the Liquid Smoke to the food item is more effective than would be a direct application of it.

The fresh food products to be processed according to the invention can be any fresh foods that can be cured or marinated at low temperatures, including meat, seafood, poultry, vegetables and fruit.

To prepare the sheet 10, the adhesive is evenly applied to one side of the film 2 by conventional means such as spraying, rolling or brushing. The thickness of the adhesive layer is calibrated, that is, made sufficient to permit the adhesive to retain the desired loading of the curing or marinating agent so that the agent adheres to the film. The following are preferred calibrations for the adhesive described herein for various types, weights and sizes of food products:

| Type of Food | Weight | Size in. | Amount of Adhesive mg. per sq. in. |
| --- | --- | --- | --- |
| Smoked Salmon | 2.5–3 lbs | 18 × 10 | 50 (includes liquid smoke in adhesive) |
| Gravad Lax | 2.5–3 lbs | 18 × 10 | 45 |
| Herring Sweet and Sour | 2–3 oz. | 6 × 2 | 50 |
| Hans Steak Ribeye | 8 oz. | 6 × 4 | 30 |
| Hans Steak Ribeye | 6 oz. | 6 × 4 | 25 |
| Lemon Pepper Pork Chop | 5 oz. | 4 × 4 | 20 |

The curing or marinating agent is then dropped onto the adhesive-coated substrate using a grooved, speed-calibrated steel roller system in such a manner as to ensure that the integrity of the curing or marinating agent is maintained and the agent is dispensed in a calibrated amount. Conventional shaking systems are not appropriate for use as they would cause constituents of the agent (being a mixture) to settle out and separate and thereby destroy the exactness of the formulation and effectiveness of the agent. The agent is then spread and massaged into the adhesive using a spreading roller and then two pressing rollers.

The loading of the curing or marinating agent is dependent on the type, weight and size of food product. In addition, the relative weights of the adhesive and curing/marinating agents is determined by the density and weight of the agent which, in turn, is dependent on the mesh size of the granulates of the agents. The following are the preferred loadings of the curing or marinating agent for various food products:

| Type of Food | Weight | Size in. | Amount of Agent mg. per sq. in. |
| --- | --- | --- | --- |
| Smoked Salmon | 2.5–3 lbs | 18 × 10 | 350 |
| Gravad Lax | 2.5–3 lbs | 18 × 10 | 300 |
| Herring Sweet and Sour | 2–3 oz. | 6 × 2 | 300 |
| Hans Steak Ribeye | 8 oz. | 6 × 4 | 250 |
| Hans Steak Ribeye | 6 oz. | 6 × 4 | 200 |
| Lemon Pepper Pork Chop | 5 oz. | 4 × 4 | 150 |

The finished sheet comprising adhesive and agent can be rolled for future use or cut into sheets of a size suitable for a particular application.

In order to carry out the method of the invention, a fresh food item is placed between two sheets 10 comprised according to the forgoing, with the adhesive/agent food treatment layer 1 in intimate contact with the food, and the sheet and food item therein may be vacuum sealed if it is intended to store the food for later consumption. Alternatively, the food can be placed between two sheets 10 and placed in a bag or container which is then vacuum sealed. It is also possible to wrap and seal the food product in a single sheet, but it is considered more convenient to use two sheets, one lower and one upper, in the packaging operation. All of these wrapping and sealing operations can be carried out with commercially-available food processing equipment well known to persons in the food-packaging industry. Similarly, the film 2 may be coated with adhesive and curing or marinating agent on both sides thereof such that portions of food can be wrapped in contact with both sides of such sheet, making a package of two food portions. Similarly, a package of many food portions can be made by using a plurality of sheets coated on both sides.

If the wrapped food is vacuum sealed the film 2 need not be impermeable to air and microorganisms since that function is fulfilled by the bag or container. However, where no vacuum bag or container is used and the sheet 10 is the only wrapping for the food, the film 2 should be impermeable to air and microorganisms.

The sealed food product is maintained at a low temperature in a refrigerator (a chiller) at least until the food is substantially cured or marinated. The term "low temperature" used herein means a temperature within a few degrees of 0° C. The refrigerator temperature is preferably in the range of −3° C. to +4° C., more preferably −1° C. to +4° C., the particular temperature depending on the particular food product.

Curing and marinating times vary widely with the fresh food product. Red meat is preferably maintained at −3° C. to +2° C. for 15–35 days, depending on the grade of meat. Salmon is preferably maintained at 0° C. for 3–5 days. The packaged food product has then been aged and cured or marinated, and has an extended shelf-life. It is ready for consumer use. It can be maintained in the chiller during its effective shelf-life, or it can be frozen for storage for future use.

The following examples illustrate embodiments of the invention.

EXAMPLE 1

An adhesive composition was prepared by blending 45% by weight maltodextrin (supplied by UFL Foods Inc., Montreal, Quebec), 10% by weight whey protein concentrate (supplied by Ault Foods Limited of Winchester, Ontario), 0.5% xanthan gum and about 44% by weight of water, until the mixture had a smooth consistency. An even coating of this adhesive was applied by means of a roller to a film. Curlam 8088-K (trademark) plastic film manufactured by Curwood Packaging (Canada) Ltd. with a thickness of 0.0035" was used. The appropriate calibrated amount of adhesive, as described above, is then applied to the film so that the sheet is ready for the application of a selected curing or marinating agent.

EXAMPLE 2

A marinating agent comprising 30% sugar, 16% beef base, 16% chicken base, 10% celery salt, 8% paprika, 5% yeast extract, 5% black pepper, 5% salt, 3% onion powder, 1% garlic powder and 1% parsley was dropped onto an adhesive-covered surface of a film comprised according to Example 1. About 240 mg per square inch of the agent was loaded into a 30 mg per square inch adhesive layer. Fresh ribeye steaks having a size of 6 in.×3 in. and weight of 8 to 9 ounces were placed between two sheets, with the marinating agent in intimate contact with the steaks. These were placed in a bag and vacuum sealed. The packaged products were stored in a refrigerator at a temperature between −1° C. and +1° C. for 21 days. The packaged products were then ready to either be cooked by a consumer, or maintained in a refrigerator during their extended shelf-life, or frozen for storage.

EXAMPLE 3

Onto an adhesive-covered surface of film was sprinkled a curing agent comprising 40% salt, 30% sugar, 23.5% pepper, 0.5% dill, 5% citric acid and 1% cream of tartar. The pH of the curing agent was adjusted to less than 3.6 using the citric acid and cream of tartar. About 390 mg. per sq. inch of curing agent was loaded into the adhesive using mechanical massaging means to ensure proper calibration. Fresh salmon fillets, having the skin and pin bones removed and being a size of about 19 in.×10 in. and weight of about 2.5 to 3 pounds were placed between two suitable-sized sheets, placed in a bag and vacuum sealed. The packaged products were stored in a chiller at 2° C. for 4–6 days. At this time, the packaged fillets were ready to be eaten, or frozen to arrest the curing process, to result in smoked salmon or Gravad Lax.

While specific compositions suitable as adhesives and as curing or marinating agents have been described herein, many other such compositions could be formulated by persons skilled in the art. All such compositions are considered to be within the scope of our invention, which is defined in the following claims.

What is claimed is:

1. A packaging material for wrapping a selectable fluid-containing fresh food item having a particular size and weight and providing simultaneous curing or marinating and storage of said food item at normal refrigeration temperatures, said packaging material comprising:

(a) a substrate suitable for contact with food; and, (b) a food treatment layer applied to a first food contacting surface of said substrate, said food treatment layer comprising a predetermined amount of a curing or marinating agent mixed in and throughout a predetermined amount of edible adhesive, wherein said adhesive dissolves in fluid from said fresh food item when said food treatment layer is placed in contact with said fresh food item at a temperature in the range of −3° C. to +4° C., said adhesive being present in a calibrated amount sufficient to hold said predetermined amount of said agent and adhere said agent to said substrate and said agent being present in an amount sufficient to cure or marinate said fresh food item of said particular size and weight when said fresh food item is stored at said temperature range and said adhesive dissolves in said fluid at said temperature range.

2. A packaging material according to claim 1 wherein said substrate is a film substantially impermeable to air and microorganisms.

3. A packaging material according to claim 2 wherein said film has a further said food treatment layer applied to a second food contacting surface of said film opposite to said first food contacting surface.

4. A packaging material according to claim 3 wherein said fresh food item is muscle cut meat.

* * * * *